United States Patent
Lewis et al.

(10) Patent No.: US 11,053,646 B2
(45) Date of Patent: Jul. 6, 2021

(54) HELICOPTER AND VTOL AIRCRAFT LANDING PAD INFORMATION SHEET

(71) Applicant: Lily Helipads, LLC, Lebanon, IN (US)

(72) Inventors: Edward D. Lewis, Brownsburg, IN (US); John Dotlich, Brownsburg, IN (US)

(73) Assignee: Lily Helipads, LLC, Lebanon, IN (US)

( * ) Notice: Subject to any disclaimer, the term of this patent is extended or adjusted under 35 U.S.C. 154(b) by 397 days.

(21) Appl. No.: 16/273,254

(22) Filed: Feb. 12, 2019

(65) Prior Publication Data

US 2019/0248511 A1 Aug. 15, 2019

Related U.S. Application Data (60) Provisional application No. 62/630,363, filed on Feb. 14, 2018.

(51) Int. Cl.
| | |
|---|---|
| *E01C 9/00* | (2006.01) |
| *B64F 1/20* | (2006.01) |
| *E01C 17/00* | (2006.01) |
| *H05B 45/20* | (2020.01) |
| *H05B 45/00* | (2020.01) |

(52) U.S. Cl.
CPC ............... *E01C 9/008* (2013.01); *B64F 1/20* (2013.01); *E01C 17/00* (2013.01); *H05B 45/00* (2020.01); *H05B 45/20* (2020.01)

(58) Field of Classification Search
CPC .... G08G 5/0013; G08G 5/0026; G08G 5/006; G08G 5/0069; F01D 5/3038; F01D 5/32; F01D 9/042; G02B 27/102; G02B 27/142; G02B 27/143; G02B 27/283; G02B 5/045; G02B 5/09; G02B 5/26
See application file for complete search history.

(56) References Cited

U.S. PATENT DOCUMENTS

| | | |
|---|---|---|
| 1,475,075 A | 7/1918 | Macy |
| 1,879,267 A | 5/1930 | Hurn |
| 1,935,159 A | 7/1930 | Mokler |
| 1,969,206 A | 6/1931 | Castendijk |
| 5,323,649 A | 6/1994 | Carlson |
| 8,091,420 B2 | 1/2012 | Wehebi |
| 2007/0048084 A1* | 3/2007 | Jung ........................ G09F 9/35 404/9 |
| 2017/0320593 A1* | 11/2017 | Van Beest ................ E01F 3/00 |

\* cited by examiner

Primary Examiner — Monica C King
(74) Attorney, Agent, or Firm — Maginot, Moore & Beck, LLP (57) ABSTRACT

A helipad includes an LED matrix built directly into the landing surface. LEDs within the matrix can be illuminated in controlled patterns to create visible objects to convey information to the pilot of an aircraft landing at the helipad and other personnel. The LEDs can be RGB color-change LEDs that are controlled to output selected colors, and can be activated with variable intensity. One of the patterns can be an arrow aligned with the wind direction as determined by an adjacent windsock, and another pattern can be determined by wind velocity as determined by an adjacent anemometer.

20 Claims, 7 Drawing Sheets

HELICOPTER AND VTOL AIRCRAFT LANDING PAD INFORMATION SHEET

PRIORITY CLAIM

This application is a utility filing from and claims priority to co-pending U.S. provisional No. 62/630,363, filed on Feb. 14, 2018, the entire disclosure of which is incorporated herein by reference.

FIELD

This disclosure relates to an information display system to aid aircraft, such as helicopter, landings in all conditions by allowing the pilot, passenger or ground crew to see real time information pertinent to aircraft landing, take off or other information that may be pertinent in the operation of the aircraft or subsequent to the procedure at hand.

BACKGROUND

A "heliport", or "vertiport" as it is often known, is a small airport suitable only for use by helicopters and other vertical take-off and landing (VTOL) aircraft. The vertiport includes one or more landing pads, or helipads, which are typically circular or square concrete pads of limited dimension since the helicopter does not need travel a significant distance linearly, as with traditional aircraft. Helipads are not limited to use in as vertiports. Many solo helipads are provided for a variety of reasons. Hospitals often include a single helipad for "medivac" or air ambulance helicopters used in the transport of patients in life-threatening situations. Many commercial buildings include a helipad for the convenience of its tenants. Even individuals may have a helipad for their personal use. Helipads are also used on large ships and on off-shore ocean platforms, such as drilling, oil or gas rigs.

The helipad dimensions are dictated by the rotor diameter and length of the helicopters that may land at the vertiport. According to FAA recommendations, a vertiport should include at least one Touchdown and Liftoff (TLOF) area centered in a Final Approach and Takeoff (FATO) area, a peripheral safety area and two or more approach and departure paths. The TLOF must be at least as long and wide as the rotor diameter of the largest helicopter that may land at on the helipad. The FATO must be at least 1.5 times the overall length of the largest helicopter, while the safety area must be at least ⅓ of the rotor diameter, but no less than 20 ft.

The typical helipad fits within a 46'×46' square and includes a variety of landing and directional markings. The perimeter of the helipad is laced with omni-directional safety lights that serve dual functions as a guide for approaching helicopters and as a warning for persons near the helipad. The TLOF, FATO, taxiways and windsock are typically lighted. Other visual aids may be provided such as landing direction lights, taxiway lights, heliport identification beacon and heliport approach path indicator (CHAPI) lights. In the typical helipad, flush green lights are used to define the TLOF perimeter with a minimum of four lights per side of the TLOF, including a light at each corner. Greens lights are required to be used to define the FATO perimeter. Landing direction lights typically include five green omni-directional lights located on the centerline of the preferred approach/departure path, spaced at 15 ft. intervals from a point not less than 20 ft. and not more than 60 ft. from the TLOF perimeter. A layout for a typical helipad and a typical lighting scheme is shown in FIG. 1.

Some systems have been proposed that provide illuminated wind direction arrows that essentially supplant the traditional windsock. Such systems are separate from the landing pad and located in the same manner as the traditional windsock. Examples of systems of this type are found in U.S. Pat. Nos. 8,091,420; 5,323,649; 1,969,206; 1,935,159; 1,879,267; and 1,475,075, the disclosure of which are expressly incorporated herein by reference. It is noted that in these prior systems the wind direction indicator essentially adopts the size and general shape of the traditional windsock.

Figure 1:
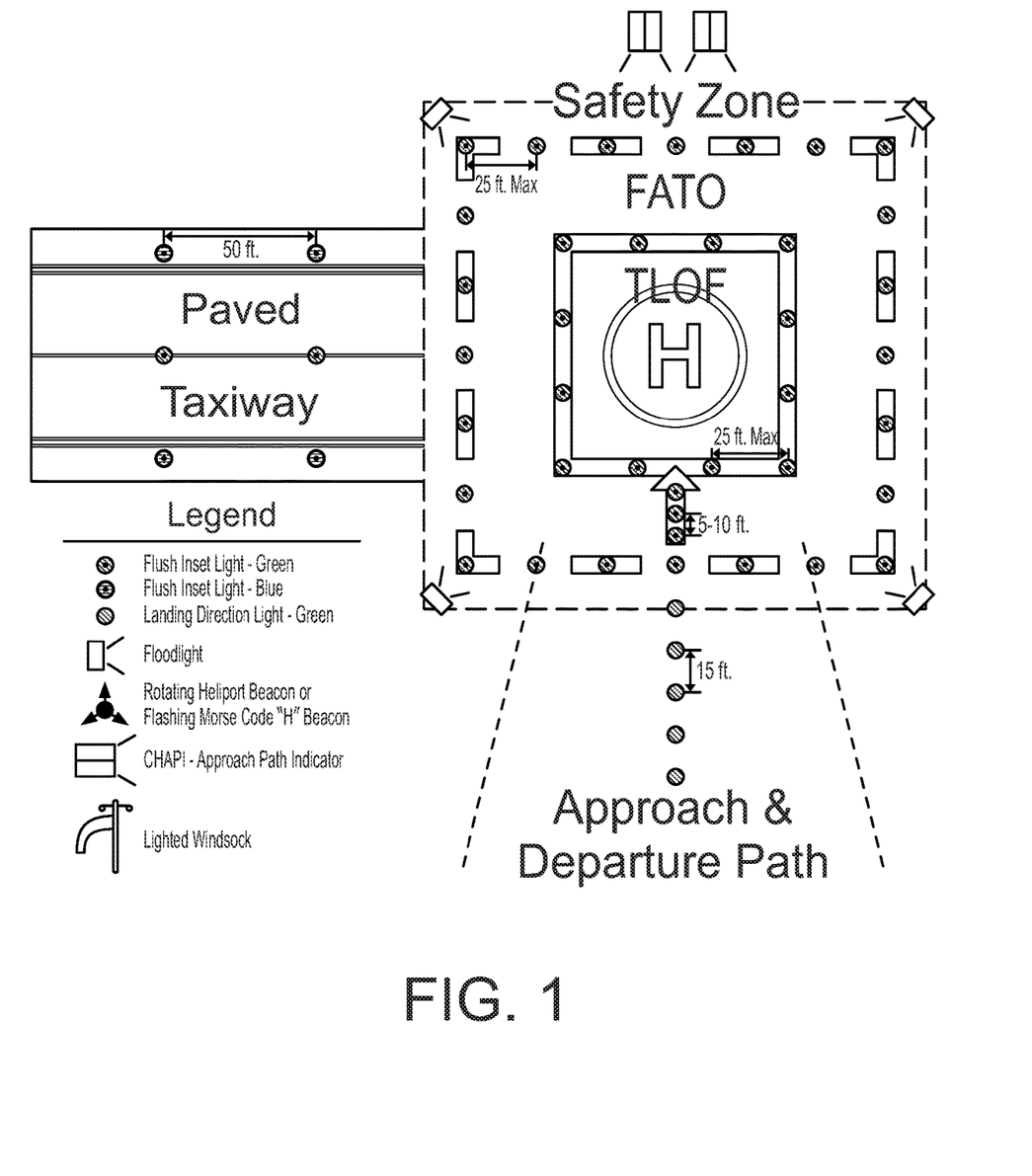
FIG. 1 is a diagram of a conventional helicopter landing and takeoff pad, or helipad, illustrating the typical FAA-approved lighting scheme for the helipad.

As can be appreciated from the conventional layout shown in FIG. 1 that the lighting scheme of the helipad requires the helicopter pilot to direct his/her attention to several locations around the helipad—from the lighted windsock, to the approach and departure lights, to the TLOF lights. There is a need for a helipad lighting scheme that can simplify the visual aids provided to the helicopter pilot.

SUMMARY OF THE DISCLOSURE

The present invention relates to communicating information to the pilot and crew of an aircraft and to the support crew on the ground, through LED matrix that is built directly into the landing surface. LEDs within the matrix can be illuminated in controlled patterns to create visible alphanumeric characters and can also be configured to illuminate as abstract animations. The RGB color change LEDs within the LED matrix can also be controlled to output selected colors, or to flash or fade patterns to alert trained ground and aircraft based personnel of pre-determined events. One feature of this remote-controlled LED matrix signaling system is that the proximity of the LED matrix is built directly into the landing pad so that the pilot never needs to fragment his or her focus during critical take-off or landing and can get real time information such as wind direction supplied in real time by an FAA approved windsock and displayed directly in line of sight on the actual landing surface.

In the normal procedure involving the take-off or landing of an aircraft, specifically but not limited to helicopters, there is a need to provide critical information in real time to the pilots of these aircraft. This information is generated and transmitted in such a way so as to aid the pilot in the operation of the aircraft while not being a means of distraction or require the pilot to change focus or even field of vision.

Simultaneous to this take-off or landing procedure, the ground crew have a need to be informed of critical events to help them to be in tune with the aircraft and its operational procedure so that they can efficiently coordinate their activity as it pertains to the operation of the aircraft or events surrounding the aircraft at that time.

This invention addresses a new way to communicate information to the pilot, aircraft crew and ground personnel in an efficient and coordinated manner that allows everyone to stay focused and on the immediate task at hand.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 2:
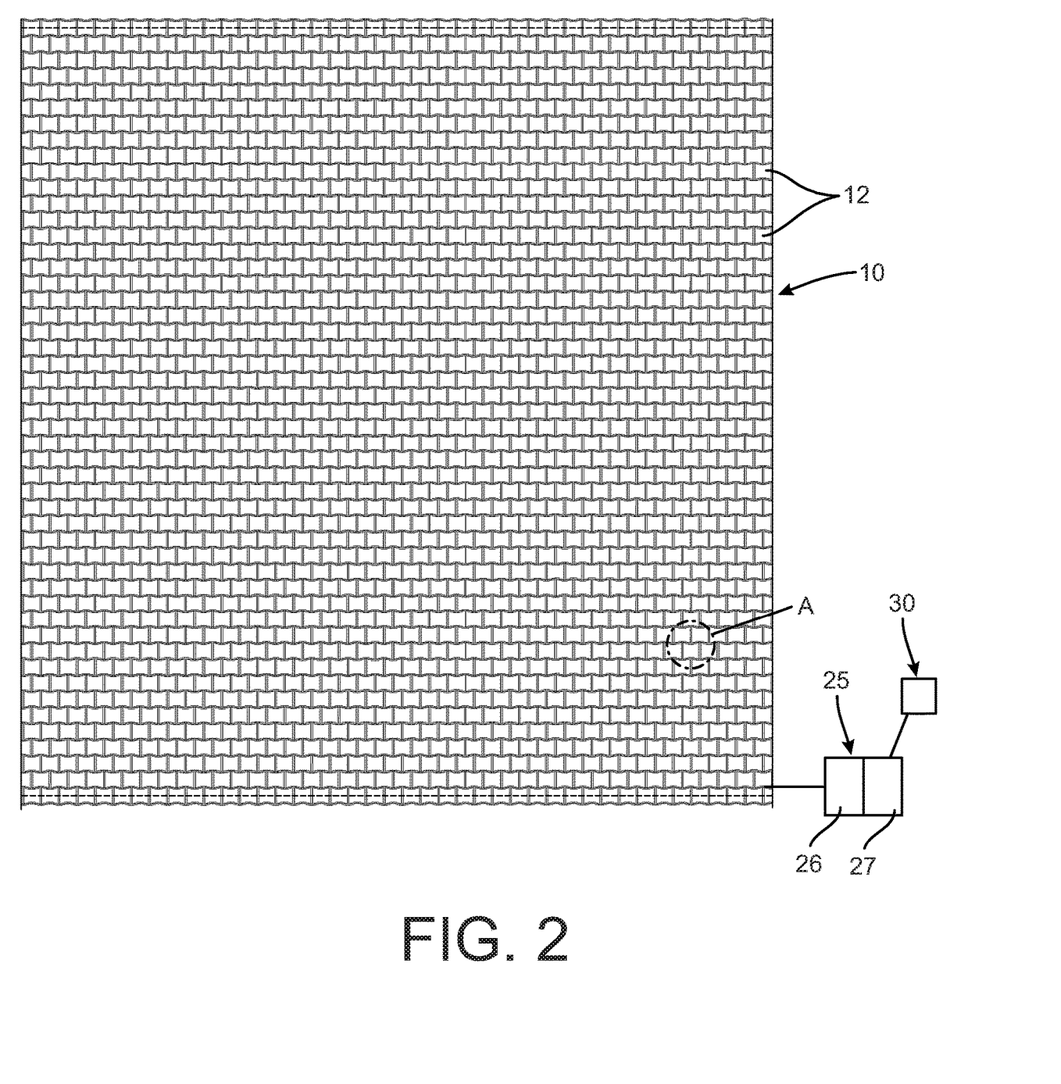
FIG. 2 top plan view of a helipad incorporating a lighting scheme according to one embodiment of the present disclosure.

The present disclosure contemplates a helipad formed by a plurality of pavers that are laid out to form the helipad surface. Details of one embodiment of such a helipad are disclosed in Applicant's prior patent entitled "Improved Helicopter landing Pads", which issued on Aug. 29, 2017, as U.S. Pat. No. 9,745,704 (the '704 Patent), the entire disclosure of which is incorporated herein by reference. In one aspect of the helipad disclosed in the '704 Patent, the pavers can have an interlocking configuration to form the helipad 10, as depicted in the plan view of FIG. 2. In a specific embodiment, each paver 12 is about 1 ft.×1 ft., so that 46 pavers in each row and column form a typical 46'×46' helipad. As explained in more detail in the '704 Patent, the pavers are installed to provide a level and even surface on which the helicopter may safely land.

Figure 3:
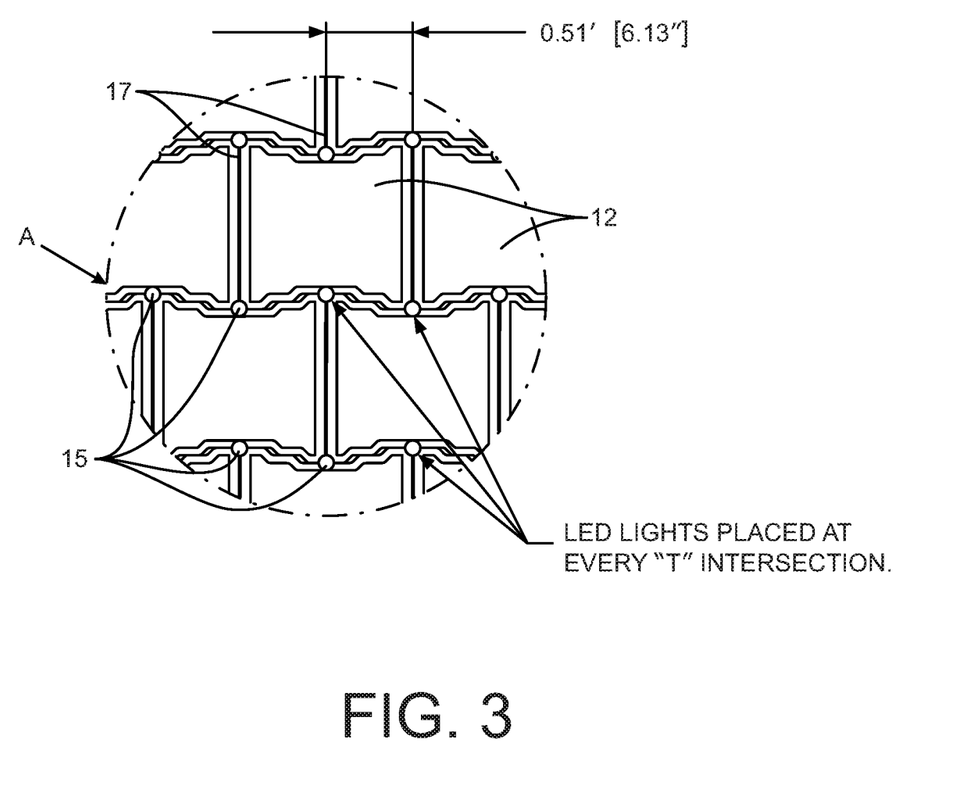
FIG. 3 is an enlarged view of a portion of the helipad depicted in FIG. 2.

As shown in the detail view A of FIG. 3, the interlocking pavers 12 used to form the helipad 10 may be provided with LED lights 15 disposed between adjacent pavers 12. In the illustrated embodiment, an LED light 15 is positioned at every intersection 17 between adjacent interlocking pavers. In the example in FIG. 2, 4000 LED lights 15 are incorporated into the 46'×46' helipad.

Figure 4:
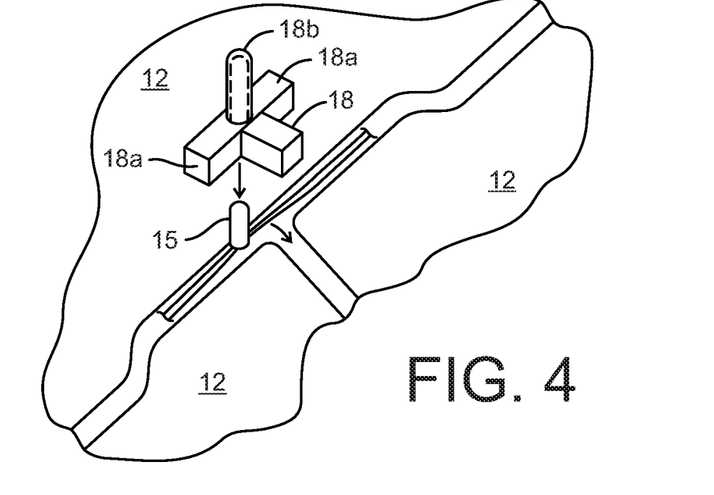
FIG. 4 is an enlarged view of the LED arrangement of the detail view in FIG. 3.
Figure 5A:
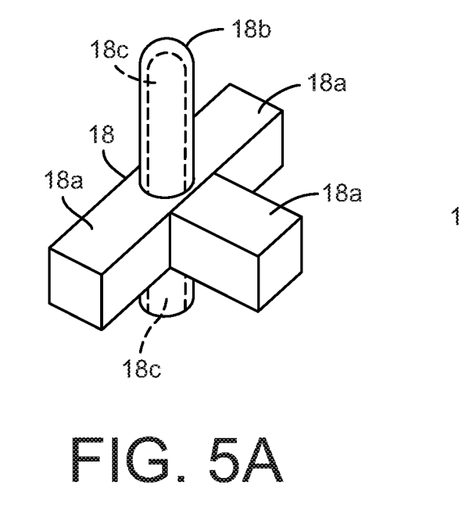
FIGS. 5A and 5B are an enlarged view of mounting elements for the LED arrangement shown in FIGS. 3-4.
Figure 5B:
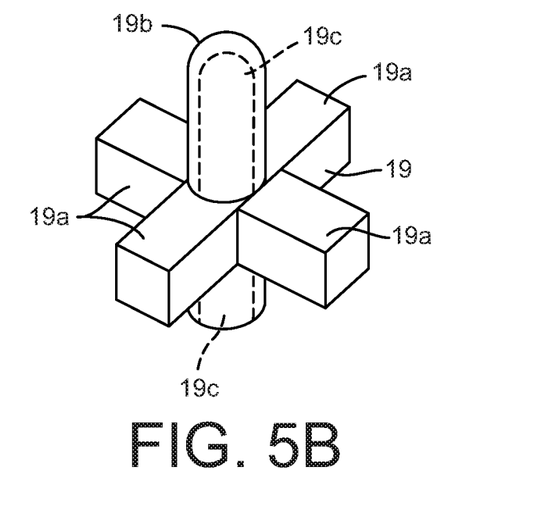

The helipad 10 includes a control system 25 (FIG. 1) that is operable to control the illumination of the LED lights 15. The controller is connected to each of the plurality of LEDs 15 by a wiring arrangement 16, as shown in the detail view of FIG. 4. The wiring arrangement 16 is configured to be seated in the gap between adjacent pavers. The LEDs are arranged to be positioned within the gap between adjacent pavers at each of the intersections 17 of the gaps. To facilitate the placement of the LEDs, a spacer 18, 19, shown in detail in FIGS. 5A-5B, is provided that is configured to be seated within a particular intersection 17. In the illustrated embodiment, the intersections 17 are all T-shaped intersections between three pavers. In this embodiment, the spacer 18 of FIG. 5A is T-shaped with three wings 18a arranged to be seated in the gap between adjacent pavers 12, as illustrated in FIG. 4. The spacer 17 includes a dome or housing 18b that receives the LED 15 upon insertion into a bore open at the base 18c of the spacer. The spacer 19 of FIG. 5B is configured for an intersection between four pavers so the spacer is X-shaped with four wings 19a, along with a corresponding dome or housing 19b and bore 19c for receiving an LED. The dome is formed of a transparent or translucent material so that light emitted by the LED can be seen. The spacer and dome are further configured to protect the LED contained therein and the associated wiring from the elements. It can be appreciated that the spacers 18, 19 can also facilitate laying out the pavers 12 to maintain a proper gap between pavers. Thus, the wings 18a, 19a can have a thickness or width sized to the conventional gap between pavers, such as 0.5 inches. The lengths of the wings are sufficient to maintain the spacer 18, 19, and thus the corresponding LED 15, at the proper location in the junction between adjacent pavers. The gap can be filled with an appropriate material, such as a grout material, to complete the helipad construction.

The plurality of LEDs 15 form an LED matrix integrated directly into the landing surface. The LED matrix can be controlled by an LED display driver 26 which can be controlled by a programmable micro-controller 27, all of which can be incorporated into the control system 25. The micro-controller 27 is provided with information from external devices 30, which can include transducers, sensors and external command computers, so that the micro-controller can command the display driver 26 as needed to illuminate the LEDs within the matrix. The LEDs can be "smart" LED lights that are individually controllable through the DMX512 protocol. The smart LEDs are capable of being illuminated with different colors, typically red, green and blue. However, the LEDs can be controlled to generate a plurality of different colors as desired. These smart LED lights are placed at pre-determined increments along a designated strand of the wiring arrangement 16 that originates at the LED display driver 26 and terminates at the end of the strand. In addition, the wiring strand can be connected to another controller in such a way as to provide performance data to that controller to allow for analysis of the performance of the LEDs in the strand should an LED fail and need to be detected and reported. The smart LEDs along a wiring strand are individually addressable by a PIC (peripheral interface controller) controller so that the control system can selectively illuminate certain LEDs in a particular pattern.

Figure 6:
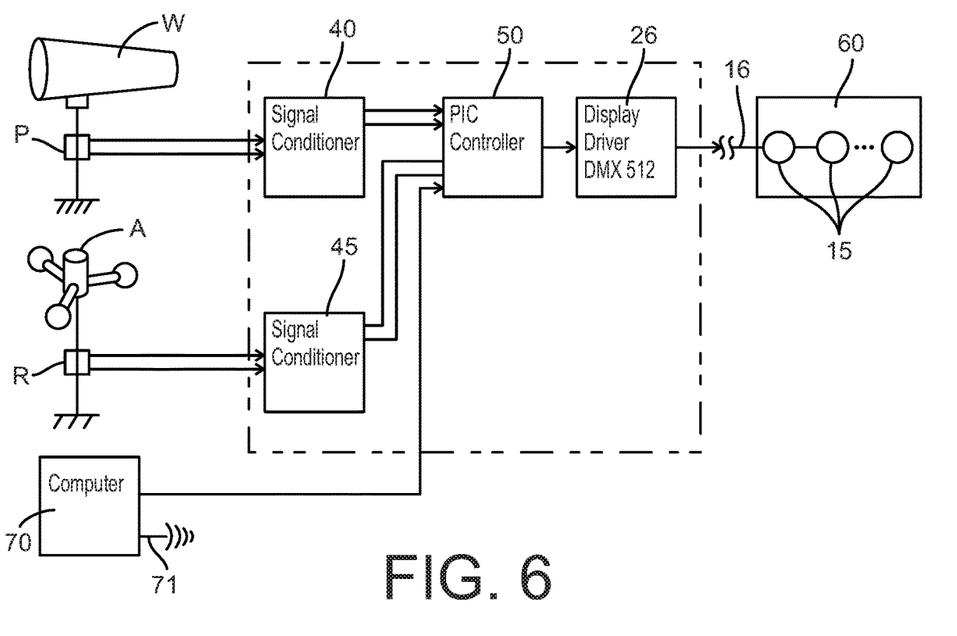
FIG. 6 is a schematic of the lighting system according to the present disclosure.
Figure 7:
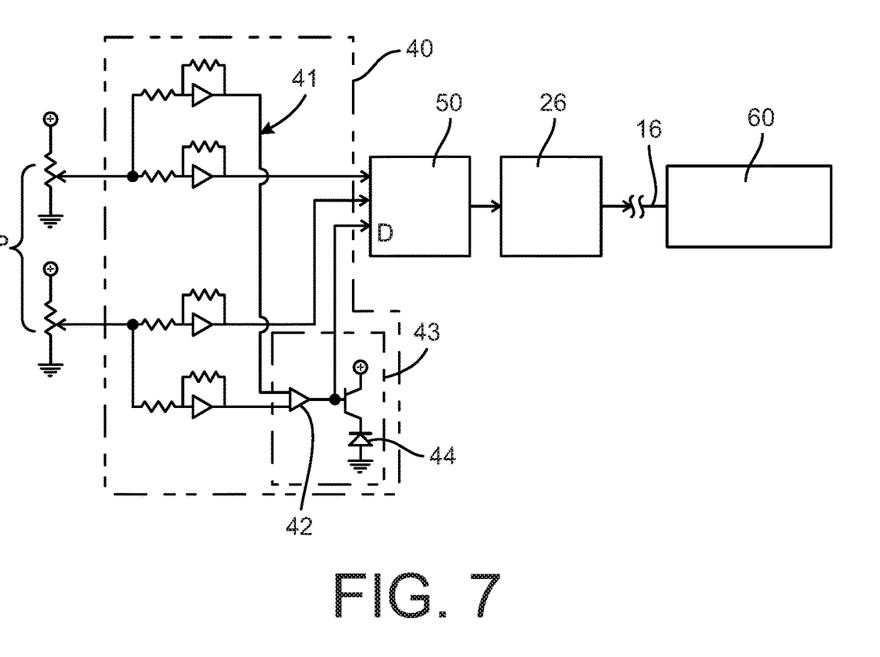
FIG. 7 is a schematic of the wind direction signal portion of the control system for the lighting system disclosed herein.

An exemplary control system 15 is depicted in FIG. 6. The system in this embodiment contemplates integrating with an FAA-approved windsock W that has industry accepted speed and sensitivity of operation. The windsock W drives a potentiometer array P, that can include two "ganged" redundant 360° potentiometers which generate signals corresponding to the position of the windsock. The potentiometer array signals pass to a signal conditioner 40 that includes isolation circuits and unity gain amplifiers, such as LM311 amplifiers, so that the potentiometer signals can be isolated before being sent on to the PIC controller 50. In one embodiment, the signal conditioner 40 receives redundant signals from two potentiometers within the array P, and these signals are fed through conditioning circuitry 41 to a comparator 42 (FIG. 7) that forms part of a fault detection circuit 43. The dual signals from the windsock W are compared to ensure continuity of the incoming signal. In the event that the two signals are not uniform, a fault indicator 44 is activated and a one-bit signal, such as a low voltage, is provided to a digital input D of the PIC controller 50. The fault indicator 43 can include a fault light or other sensible alert. If the analog comparator 42 sees that both input signals from the potentiometer array P are the same (or within a tolerance band) then the one-bit output will remain high (5 vdc) to the digital input D of the PIC chip controller 4 digital input. The signals from both potentiometers in the array P are isolated and buffered by the LM311's in the conditioning circuitry 41 and can be provided at two separate analog inputs of the PIC controller 50. The PIC controller can use one of these inputs as information to sense the position of the windsock. Alternatively, the PIC controller 50 can also compare both inputs in digital fashion to check that the signals are the same or within a pre-determined tolerance band, in lieu of or in parallel with the fault detection circuit 43.

The PIC controller 50 is programmed to process the incoming signal from the windsock potentiometer array P and interpolate that information into a signal or series of signals that are output from the PIC controller to an input of the display driver 26. In particular, the PIC controller 50 is programmed to read the data from the potentiometer array P to find the angular orientation of the windsock W corresponding to the wind direction. The PIC controller then determines which LEDs 15 in an LED matrix 60 must be illuminated to form an arrow in the angular direction of the windsock. The PIC controller sends instructions to the display driver 26, which can be a DMX 512 LED matrix driver in one embodiment. The display driver 26 sends control signals from the output of the driver, or DMX 512, to the matrix 60 of LEDs 15 so that certain LEDs are illuminated in a specific pattern and in specific colors capable of displaying visual information.

Figure 9:
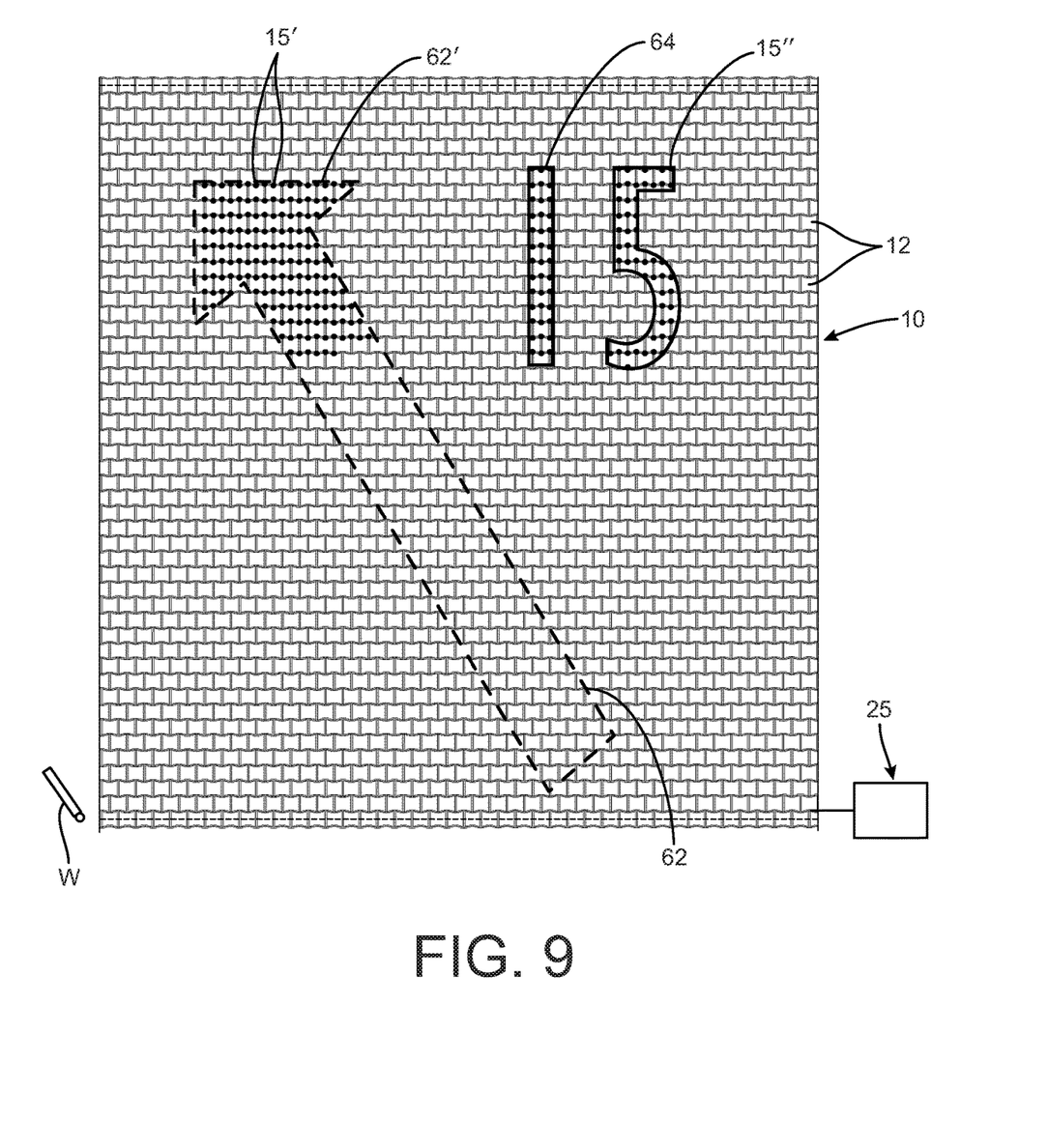
FIG. 9 is a view of the helipad of FIG. 2 with the LED arrangement illuminated as a wind direction indicator.

In accordance with the present disclosure, the PIC controller 50 directs the display driver to activate selected LEDs of the matrix 60 to produce a visual representation of wind direction on the helipad 10, as illustrated in FIG. 9. In one specific embodiment, the LEDs 15 of the matrix can be 12 millimeter RGB LEDs, such as Top Lamp TP-DBS-RGB12WP IC "Smart" LEDs, that are individually addressable by the display driver, such as the Top Lamp T-300K DMX 512 LED driver. In the illustrated embodiment, the LED matrix 60 has 44 lines of LEDs that are 12 inches apart with 88 LEDs per line that are six inches apart across the landing area. This LED matrix configuration is capable of the output resolution necessary to create the required FAA size and shape directional indication arrow that is specified by the FAA—namely an arrow length of 12 ft. with a point that is 3 ft. long and 3 ft. wide. However, the system disclosed herein permits a much larger arrow 62 created by the activated LEDs 15' that can span the entire length and width of the helipad, as depicted in FIG. 9. Thus, in one aspect of the present disclosure, a wind direction arrow 62 can be displayed that is runs parallel to the windsock W and that can be 40 ft. long so that the arrow can be seen by the pilot at all approach angles and altitudes.

Figure 8:
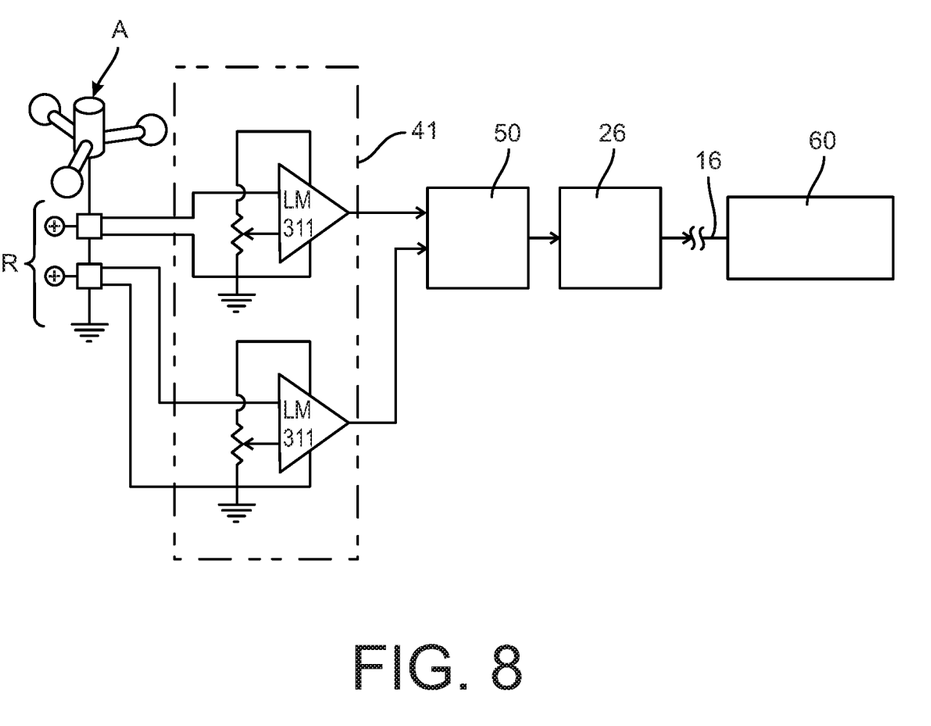
FIG. 8 is a schematic of the wind speed signal portion of the control system for the lighting system disclosed herein.

Returning to FIG. 6, wind speed information can be obtained from an anemometer A that is detected by a resolver array R, that can include two resolvers or two 360-degree continuous potentiometers that are ganged together. The output signals from the resolver array R is buffered and isolated in a signal conditioner 45 that can be similar to the signal conditioner 40 for the windsock W. One specific embodiment of the resolver array and signal conditioner is depicted in FIG. 8 in which the resolver array includes two Hall sensors with the outputs fed to separate LM311 unity gain amplifiers. The output from the two amplifiers can be fed directly to the PIC chip 50 where signal continuity is verified, or a fault detection circuit, such as the circuit 43 can be incorporated into the anemometer signal conditioner 45.

The signals generated by the anemometer are fed through the signal conditioner to the PIC controller 50 that can be adapted to translate the anemometer data to wind speed information, either by on-board logic or by reference to a separate computer 70. The PIC controller directs the display driver 26 to activate the activated LEDs 15' in a particular color. In one embodiment, the direction arrow 62 shown in FIG. 9 can be formed by illuminating a subset 62' of the activated LEDs 15' in specific color, such as green, to signify a specific wind speed, maximum wind speed or wind speed range. For instance, illuminating the arrow 62 or the subset 62' in green can signify a wind speed below 5 knots, illuminating LEDs in blue can signify a wind speed of 5-10 knots, and illuminating selected LEDs in red can signify a wind speed above 20 knots. Alternatively, the length of the specially colored LEDs in the subset 62' can provide a visual indication of wind speed, such that the longer the subset 62' the greater the wind speed. In another alternative, a separate subset 64 of LEDs 15" can be illuminated to display a numeric number corresponding to the detected wind speed. In a further alternative, the LEDs in the matrix 60 can be alternated between displaying the arrow 62 and displaying the numeric indicia 64.

It can be appreciated that the control system 25 can receive other information and generate other displays depending on the information to be provided. For instance, the external devices 30 can include wind shear detection and the control system 25 can be configured to illuminate all or part of the LED matrix in red signifying a dangerous landing condition. The devices 30 can also include a laser array configured to determine the alignment of the approaching aircraft relative to the helipad and generate a guidance image to help align the aircraft with the center of the helipad 10. The LEDs 15 of the matrix 60 can also be illuminated in a pattern to provide information to ground crew, such as to indicate the approach of an aircraft to the helipad. In a less critical mode of operation, the LEDs 15 can be illuminated to identify the name of the helipad or even to convey a message to passengers in the aircraft. The LEDs can be illuminated in a pattern for alphanumeric characters, graphics or a combination of both. The LEDs can change color schemes interactively to signal alert levels and can be tied to other lights in the vicinity of the helipad, such as ramps to the helipad.

In a further feature, the intensity or brightness, as well as the color, of the LEDs 15 can be controlled by the control system 25. The PIC controller 50 and DX controller 26 described above are capable of establishing the color and brightness/intensity of the selected LEDs. These attributes of the selected LEDs can be pre-programmed, such as the required green for the LEDs defining the FATO perimeter (see FIG. 1). In a further aspect, the attributes of the selected LEDs can be interactively controlled by the pilot or ground crew of the vertiport. For the interactive control, the control system 25 or an associated computer 70 can be provided with an antenna 71 for receiving control signals from the aircraft and/or ground crew. For example, the landing zone can be initially illuminated by green LEDs at their maximum brightness so that the pilot can readily discern the LZ, even under low visibility conditions. As the aircraft approaches the helipad, the pilot can key the aircraft mike a pre-set number of times to signal the control system 25 to reduce the brightness of the green LEDs. As the aircraft descends, the pilot may repeatedly key the mike for further brightness reductions so that the pilot is never blinded by landing lights that are too bright. The control system may also incorporate an ambient light sensor and operate to adjust the brightness of the LEDs accordingly.

It is also appreciated that the computer 70 can receive data from the controller 25. For instance, such data can include information indicative of the health of the LEDs in the matrix 60 to identify any defective or failed LED. The data can also include fault data generated by the signal conditioners 40, 45 as an indication of the health of the wind speed and direction devices. The computer can also maintain a record of any communications with the pilot of an aircraft approaching and/or landing on the helipad. The computer can also serve as an interface for providing a specialized display on the helipad.

It is recognized that some implementations of a helipad may not be suitable for the paver configuration disclosed herein, due to weight and/or construction concerns. For instance, some rooftop helipads are constructed of an aluminum panel system mounted to the rooftop. The lighting arrangement disclosed herein can be incorporated into rooftop panel systems of this type. The panel system can include a single panel or a plurality of aluminum panels constructed to emulate the paver construction with grooves or channels for receiving the wiring arrangement 16 and intersections to accommodate the spacers 18, 19 containing the LEDs 15 (or alternatively the LEDs 15 alone). In an alternative design, the aluminum panel system can include a plurality of recesses for receiving the LEDs 15, without the spacers, and can be configured to contain the wiring arrangement 16 beneath the landing surface of the panel system.

Conventional aluminum panels are generally low friction surfaces, so although the aluminum panels are strong enough for landing a helicopter, they can be slippery for passenger exiting the aircraft. Thus, in one modification, a higher friction surface can be added to the landing surface of the helipad panel system. In one specific embodiment, the friction surface can be a rubber or plastic mat(s) affixed to the existing panel system. The mat(s) can be configured to emulate the paver construction, as discussed above, or can integrate features for supporting the LEDs 15, with or without spacers 18, 19, as well as carrying the wiring arrangement 16. In one augmentation, the mat(s) affixed to the panel system can incorporate heating elements to help eliminate accumulation of ice or snow on the landing surface. The heating elements can include a separate wiring arrangement that is connected to the control system 25 or to a separate dedicated control system, with the control system configured to activate the heating elements in response to certain weather conditions.

The present disclosure should be considered as illustrative and not restrictive in character. It is understood that only certain embodiments have been presented and that all changes, modifications and further applications that come within the spirit of the disclosure are desired to be protected.

What is claimed is:

1. A helipad for landing of a helicopter or a vertical take-off and landing aircraft, the helipad having a device for determining wind direction at the helipad, the helipad comprising:
   a plurality of pavers positioned adjacent each other with a gap between adjacent pavers, the plurality of pavers defining a landing surface for landing of the aircraft, the gap between the plurality of pavers defining a plurality of intersections;
   a plurality of LEDs (light emitting diodes) defining an LED matrix, one each of said plurality of LEDs disposed in a corresponding one of said plurality of intersections and each of said plurality of LEDs including wiring extending along a gap to a location outside the landing surface defined by the plurality of pavers; and
   a controller connectable to said device for determining wind direction and connected to each of said plurality of LEDs, said controller configured to receive data from the device indicative of wind direction and to determine which of said plurality of LEDs to activate to define a lighted arrow on said helipad aligned with the wind direction.

2. The helipad of claim 1, further comprising a spacer corresponding to each of said plurality of LEDs, said spacer configured to be seated within said gap between adjacent pavers and including a hollow interior for housing the corresponding LED.

3. The helipad of claim 2, wherein said plurality of pavers are arranged to define T-shaped intersections between adjacent pavers and the spacer corresponding to each of said plurality of LEDs is T-shaped.

4. The helipad of claim 2, wherein said plurality of pavers are arranged to define X-shaped intersections between adjacent pavers and the spacer corresponding to each of said plurality of LEDs is X-shaped.

5. The helipad of claim 1 further having a device for detecting wind speed at the helipad, wherein said controller is connectable to said device for detecting wind speed and is configured to receive data from the device indicative of wind speed and to determine which of said plurality of LEDs to activate to define a visual indication of wind speed.

6. The helipad of claim 5, wherein said visual indication of wind speed is a numeric on said helipad, whereby said controller activates LEDs of said plurality of LEDs to form the numeric indication.

7. The helipad of claim 6, wherein said controller is operable to display said numeric indication is offset from and simultaneous with said lighted arrow indicative of wind direction.

8. The helipad of claim 6, said controller is operable to alternately display said numeric indication and said lighted arrow indicative of wind direction.

9. The helipad of claim 5, wherein:
   said plurality of LEDs are capable of emitting light in different colors; and
   said controller is configured to activate the LEDs forming the visual indication of wind speed in a different color than the LEDs activated to define the lighted arrow.

10. The helipad of claim 9, wherein the color of the LEDs forming the visual indication of wind speed correspond to the magnitude of the detected wind speed.

11. The helipad of claim 9, wherein the LEDs forming the visual indication of wind speed are disposed within the lighted arrow.

12. The helipad of claim 9, wherein the LEDs forming the visual indication of wind speed extend along a length of the lighted arrow, with the length of the visual indication of wind speed corresponding to the magnitude of the detected wind speed.

13. The helipad of claim 1, wherein said controller includes:
   a peripheral interface controller (PIC controller) connected to the device for determining wind direction; and
   a display driver connected between the PIC controller and the plurality of LEDs,
   wherein the PIC controller receives the data from the device indicative of wind direction and is programmed to determine which of said plurality of LEDs to activate to define a lighted arrow on said helipad aligned with the wind direction, and the display driver is configured to activate the selected LEDs in response to instructions from the PIC controller.

14. A helipad for landing of a helicopter or a vertical take-off and landing aircraft, the helipad having a device for determining wind direction at the helipad, the helipad comprising:

a panel system configured to bear the weight of an aircraft landing on the helipad;

a plurality of LEDs (light emitting diodes) defining an LED matrix incorporated into the panel system; and a controller connectable to said device for determining wind direction and connected to each of said plurality of LEDs, said controller configured to receive data from the device indicative of wind direction and to determine which of said plurality of LEDs to activate to define a lighted arrow on said helipad aligned with the wind direction.

15. The helipad of claim 14, further having a device for detecting wind speed at the helipad, wherein said controller is connectable to said device for detecting wind speed and is configured to receive data from the device indicative of wind speed and to determine which of said plurality of LEDs to activate to define a visual indication of wind speed.

16. The helipad of claim 15, wherein said visual indication of wind speed is a numeric on said helipad, whereby said controller activates LEDs of said plurality of LEDs to form the numeric indication.

17. The helipad of claim 16, wherein said controller is operable to display said numeric indication is offset from and simultaneous with said lighted arrow indicative of wind direction.

18. The helipad of claim 16, said controller is operable to alternately display said numeric indication and said lighted arrow indicative of wind direction.

19. The helipad of claim 15, wherein:

said plurality of LEDs are capable of emitting light in different colors; and said controller is configured to activate the LEDs forming the visual indication of wind speed in a different color than the LEDs activated to define the lighted arrow.

20. The helipad of claim 19, wherein the LEDs forming the visual indication of wind speed extend along a length of the lighted arrow, with the length of the visual indication of wind speed corresponding to the magnitude of the detected wind speed.

* * * * *